United States Patent
Behzadi (10) Patent No.: US 6,728,220 B2
(45) Date of Patent: Apr. 27, 2004

(54) METHOD AND SYSTEM FOR PREVENTING TRANSMISSION LOOPS IN A LABEL SWITCHING DOMAIN

(75) Inventor: Behnam Behzadi, Sunnyvale, CA (US)

(73) Assignee: Riverstone Networks, Inc., Santa Clara, CA (US)

( * ) Notice: Subject to any disclaimer, the term of this patent is extended or adjusted under 35 U.S.C. 154(b) by 0 days.

(21) Appl. No.: 09/865,035

(22) Filed: May 24, 2001

(65) Prior Publication Data

US 2002/0176371 A1 Nov. 28, 2002

(51) Int. Cl.[7] .......................... H04L 12/40; H04L 12/28
(52) U.S. Cl. ........................................ 370/254; 370/392
(58) Field of Search ................................ 370/254, 255, 370/256, 257, 258, 392, 389, 222, 223, 229, 400, 401, 402, 403, 404, 405, 473, 474, 465, 466; 709/238

(56) References Cited

U.S. PATENT DOCUMENTS

| | | |
|---|---|---|
| 4,604,693 A | 8/1986 | Chadima, Jr. et al. |
| 5,991,300 A * | 11/1999 | Tappan ..................... 370/392 |
| 6,047,331 A | 4/2000 | Medard et al. |
| 6,130,889 A * | 10/2000 | Feldman et al. ............ 370/389 |
| 6,205,488 B1 | 3/2001 | Casey et al. |
| 6,339,595 B1 * | 1/2002 | Rekhter et al. ............. 370/392 |

FOREIGN PATENT DOCUMENTS

WO   WO 00/76126 A2   12/2000

OTHER PUBLICATIONS

Rosen et al., MPLS Label Stack Encoding, International Engineering Task Force, Network Working Group, RFC 3032, Jan. 2001.

* cited by examiner

Primary Examiner—William A. Luther
(74) Attorney, Agent, or Firm—Mark Wilson (57) ABSTRACT

Preventing transmission loops in a ring network that utilizes label switching involves generating right side and left side ring packets from an ingress packet and setting right and left TTL values for the packets that prevent the packets from traveling on the same transmission link. Setting the right and left TTL values of the ring packets to values that prevent the packets from traveling on the same link transforms the physical topology of the ring into a logical arc. In an embodiment, the logical arc established by a network node can be dynamically rotated in response to various network conditions to avoid packet transmissions on a particular link of the ring network.

79 Claims, 9 Drawing Sheets

METHOD AND SYSTEM FOR PREVENTING TRANSMISSION LOOPS IN A LABEL SWITCHING DOMAIN

FIELD OF THE INVENTION

The invention relates to label switching, and more particularly to a method and system for preventing transmission loops between a group of network nodes that are connected to form a ring.

BACKGROUND OF THE INVENTION

In packet-switched networks, packets traveling from a source address to a destination address may be transmitted through many intermediate network nodes, such as switches or routers. Intermediate network nodes that receive packets headed for the destination address utilize look-up tables to determine where the packets should be forwarded next. If an intermediate network node is familiar with the destination address of the packets, the packets are forwarded to the appropriate next hop. However, if the destination address of the packets is unknown to the network node, the network node may forward the incoming packets onto all of its ports, except for the port at which the packets were received, in order to deliver the packet to the unknown destination address. This technique for locating an unknown destination address, referred to as "flooding," is repeated at each network node that is unfamiliar with the destination address of the packets until the packets eventually reach their destination or a network node that is familiar with the destination address of the packets. Return packets are then transmitted from the destination to the source through the intermediate network nodes. Once one of the packets is received by an intermediate network node, information regarding the destination address of the packet is learned by the intermediate network nodes so that subsequent packets do not have to be flooded. Although flooding works well to learn an unknown destination address, in mesh and ring network topologies, flooding at each network node often causes transmission loops that can quickly multiply and overwhelm a network node, causing traffic delays and network crashes. The occurrence of transmission loops is also a problem with multicast and broadcast packet transmissions.

One technique that is used at the Data Link layer (layer 2) to prevent transmission loops in a group of network nodes involves breaking the network topology down into a loop-free topology, also referred to as a spanning tree. A spanning tree protocol (STP) for determining, establishing, and maintaining a loop-free topology that includes every reachable link in a given network has been standardized by the Institute of Electrical and Electronics Engineers (IEEE) as IEEE 802.1D. The STP involves determining a Root Bridge, determining the Designated Bridges and Designated Ports for each link, and maintaining the spanning tree topology over time. Although the Spanning Tree Protocol works well to create loop-free topologies, establishing and maintaining the spanning tree is a cumbersome and resource intensive process.

As described above, packets traveling from a source address to a destination address may be transmitted through many intermediate network nodes. Performing forwarding look-ups at the intermediate network nodes based on the destination address of each packet adds delay to the packets. Label switching is a technique that has been developed to expedite the look-up process at each hop as packets travel from a source address to a destination address. In brief, label switching involves attaching a label to a packet that enables the next hop of the packet to be quickly determined by an intermediate network node that has received the packet. One label switching protocol that is being standardized by the Internet Engineering Task Force (IETF) is known as multi-protocol label switching (MPLS).

Figure 1:
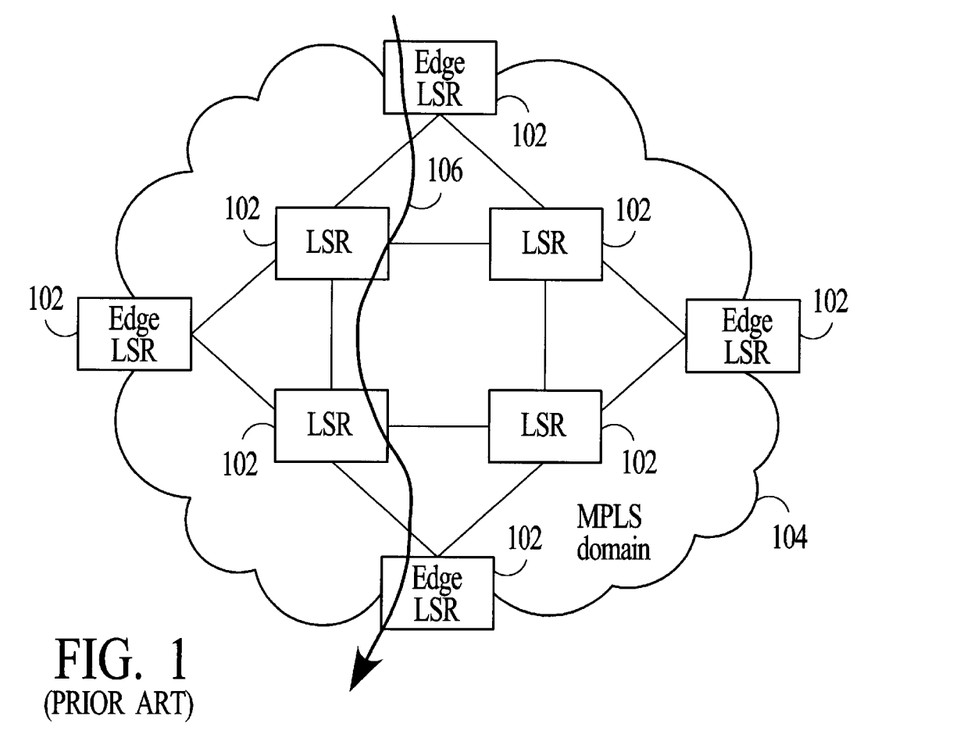
FIG. 1 depicts a group of network nodes that utilize MPLS to forward packets.

FIG. 1 depicts a group of network nodes 102 that utilize MPLS to forward packets. The network nodes are referred to as label switch routers (LSRs) and a group of interconnected LSRs define an MPLS domain 104. LSRs that are at the edge of the MPLS domain and provide an interface to non-MPLS network nodes are referred to as edge LSRs (also as ingress LSRs and egress LSRs with respect to packets that are entering or leaving the MPLS domain). The path that labeled packets travel through an MPLS domain is referred to as the label switch path (LSP). FIG. 1 depicts an example LSP 106 that extends through the MPLS domain. MPLS is often used in conjunction with the Internet protocol (IP) at the Network layer (layer 3) and a Data Link layer (layer 2) protocol such as the Ethernet protocol (IEEE 802.3x). According to the MPLS protocol, an MPLS label, also referred to as a "shim header," is inserted between the Network layer header and the Data Link layer header to guide a labeled packet through an MPLS domain. MPLS can also be used in a layer 2 environment where the shim header is located between two layer 2 headers.

Figure 2:
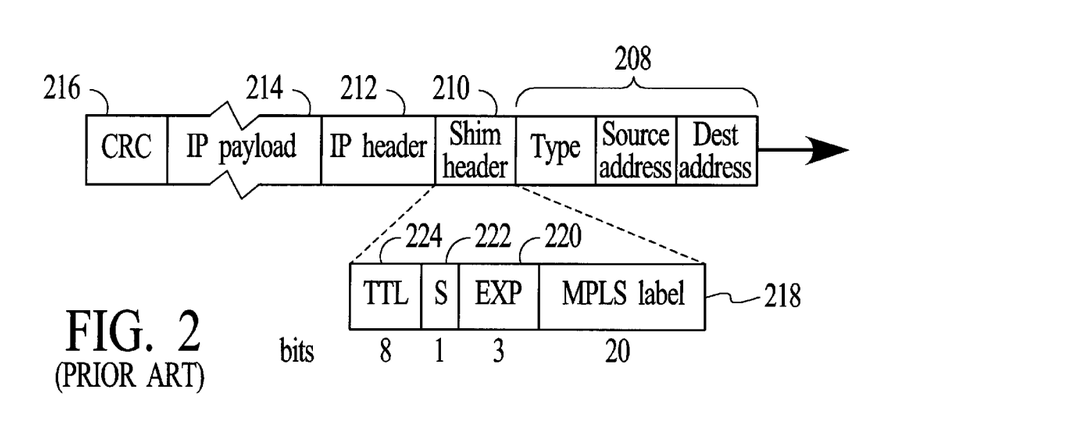
FIG. 2 depicts an example of a packet that includes an IP header, an MPLS Shim header, and an Ethernet header.

FIG. 2 depicts an example of a labeled packet that includes a MAC (Data Link layer or layer 2) header 208 (the destination address, the source address, and the type), a label switching header 210 (also referred to as the shim header), an IP header 212, an IP payload 214, and a MAC trailer 216 (the CRC). As described by the IETF (RFC 3032, January 2001) and shown in the expanded view of FIG. 2, the shim header includes a 20-bit MPLS label field 218, a 3-bit experimental use field 220, a 1-bit stacking field 222, and an 8-bit time-to-live (TTL) field 224. The MPLS label field carries the label value that is used to forward a packet to the next LSR. The experimental use field is not yet fully defined, the stacking field is used to identify when an MPLS header is the last MPLS header in a stack of MPLS headers, and the TTL field carries a TTL value that places a limit on the number of hops an MPLS packet can traverse within an MPLS domain. The TTL field limits the number of hops a packet can take within an MPLS domain. Typically, in an IP environment, the TTL value of an MPLS label is initially set from the TTL value of the underlying IP packet and the IP packet TTL value is typically set by a host to an arbitrary number of hops. Although MPLS can increase transmission efficiency in an MPLS network, setting the TTL value in the MPLS Shim header to the TTL value of the underlying IP packet does not prevent loops within an MPLS domain. Additionally, in a layer 2 environment, the underlying MAC header does not include a TTL value that can be used to set the TTL value in the MPLS shim header.

In view of the problems caused by flooding, multicasting, and broadcasting, what is needed is a technique that prevents transmission loops and that is compatible with a label switching protocol such as MPLS.

SUMMARY OF THE INVENTION

A method and system for preventing transmission loops in a ring network that utilizes label switching involves generating right side and left side ring packets from an ingress packet and setting right and left TTL values for the packets that prevent the packets from traveling on the same transmission link. Setting the right and left TTL values of the ring packets to values that prevent the packets from traveling on the same link transforms the physical topology of a ring into a logical arc. In an embodiment, the logical arc established by a network node can be dynamically rotated to avoid packet transmissions on a particular link of the ring network.

In an embodiment, a method for preventing transmission loops is implemented between a plurality of network nodes that are connected by transmission links to form a ring, wherein each network node on the ring includes a right side ringport that is connected to a right side neighbor and a left side ringport that is connected to a left side neighbor and wherein each of the network nodes in the ring utilizes a label switching protocol that includes a label, the label including a label field for carrying a label value and a time-to-live (TTL) field for carrying a TTL value. The method involves generating, at a first one of the plurality of network nodes, a right side packet and a left side packet from an ingress packet and setting a right side TTL value for the right side packet and a left side TTL value for the left side packet to values that prevent the right side packet and the left side packet from traveling on the same transmission link on the ring.

An embodiment of the method includes learning the number (N) of network nodes on the ring. A further embodiment includes setting the right side TTL value and the left side TTL value to values that are a function of N. A further embodiment includes setting the right side TTL value and the left side TTL value such that the maximum number of right side hops (MaxRightHops) plus the maximum number of left side hops (MaxLeftHops) is less than or equal to N−1, the function of N being expressed as: MaxRightHops+MaxLeftHops≦N−1.

Another embodiment of the method includes setting the right side TTL value and the left side TTL value such that the number of hops for the right side packet is equal to the number hops for the left side packet.

Another embodiment of the method includes setting the right side TTL value and the left side TTL value such that the number of hops for the right side packet differs from the number hops for the left side packet by one hop.

Another embodiment of the method includes setting the right side TTL value and the left side TTL value such that the furthest transmission link from the first network node is a transmission link that is not utilized by either the right side packet or left side packet.

Another embodiment of the method includes setting the right side TTL value and the left side TTL value in response to link performance information related to the transmission links that connect the network nodes into the ring.

Another embodiment of the method includes dynamically adjusting the right side and left side TTL values.

Another embodiment of the method involves transmitting the right side packet on the right side ringport of the first network node and the left side packet on the left side ringport of the first network node. A further embodiment includes decrementing the right side TTL value of the right side packet at each network node on the ring that receives the right side packet and the left side TTL value of the left side packet at each network node on the ring that receives the left side packet.

In an embodiment of the method, the label is located between two Data Link layer headers.

In an embodiment of the method, the network nodes utilize Ethernet at the Data Link layer.

In an embodiment of the method, the label is a Multiprotocol Label Switching (MPLS) header. In a further embodiment, the method includes establishing, at the first network node, multiple label switch paths that have different quality of service characteristics and setting the same right side TTL values and left side TTL values for all packets transmitted on the multiple LSPs.

In another embodiment, a method for preventing transmission loops is implemented between a plurality of network nodes that are connected by transmission links to form a ring, wherein each network node on the ring includes a right side ringport that is connected to a right side neighbor and a left side ringport that is connected to a left side neighbor and wherein each of the network nodes in the ring utilizes a label switching protocol that includes a label, the label including a label field for carrying a label value and a time-to-live (TTL) field for carrying a TTL value. The method involves learning, at a first one of the plurality of network nodes, the number (N) of network nodes on the ring, generating, at the first network node, a right side packet and a left side packet from an ingress packet, and setting a right side TTL value for the right side packet and a left side TTL value for the left side packet to values that are a function of N.

An embodiment of the method includes setting the right side TTL value and the left side TTL value to values that prevent the right side packet and the left side packet from traveling on the same transmission link on the ring.

Another embodiment of the method includes setting the right side TTL value and the left side TTL value such that the maximum number of right side hops (MaxRightHops) plus the maximum number of left side hops (MaxLeftHops) is less than or equal to N−1, the function of N being expressed as MaxRightHops+MaxLeftHops≦N−1.

An embodiment of a system for preventing transmission loops in a ring network includes a plurality of network nodes, with each network node including a right side ringport, a left side ringport, a packet processor, and a loop protection module. The network nodes are connected by transmission links to form a ring, wherein each of the network nodes on the ring utilizes a label switching protocol that includes a label, the label including a label field for carrying a label value and a time-to-live (TTL) field for carrying a TTL value. The right side ringport of each network node is connected to a right side neighbor and the left side ringport is connected to a left side neighbor. The packet processor of each network node generates a right side packet and a left side packet from an ingress packet and the loop protection module sets a right side TTL value for the right side packet and a left side TTL value for the left side packet to values that prevent the right side packet and the left side packet from traveling on the same transmission link on the ring.

Another embodiment of a system for preventing transmission loops in a ring network includes a plurality of network nodes, with each network node including a right side ringport, a left side ringport, a packet processor, and a loop protection module. The network nodes are connected by transmission links to form a ring, wherein each of the network nodes on the ring utilizes a label switching protocol that includes a label, the label including a label field for carrying a label value and a time-to-live (TTL) field for carrying a TTL value. The right side ringport of each network node is connected to a right side neighbor and the left side ringport is connected to a left side neighbor. The packet processor of each network node generates a right side packet and a left side packet from an ingress packet. The loop protection module learns the number (N) of network nodes on the ring and sets a right side TTL value for the right side packet and a left side TTL value for the left side packet to values that are a function of N.

In an embodiment of the system, the right side TTL value and the left side TTL value are set such that the maximum number of right side hops (MaxRightHops) plus the maximum number of left side hops (MaxLeftHops) is less than or equal to N−1, the function of N being expressed as MaxRightHops+MaxLeftHops≦N−1.

Other aspects and advantages of the present invention will become apparent from the following detailed description, taken in conjunction with the accompanying drawings, illustrating by way of example the principles of the invention.

BRIEF DESCRIPTION OF THE INVENTION

DETAILED DESCRIPTION OF THE INVENTION

Figure 3:
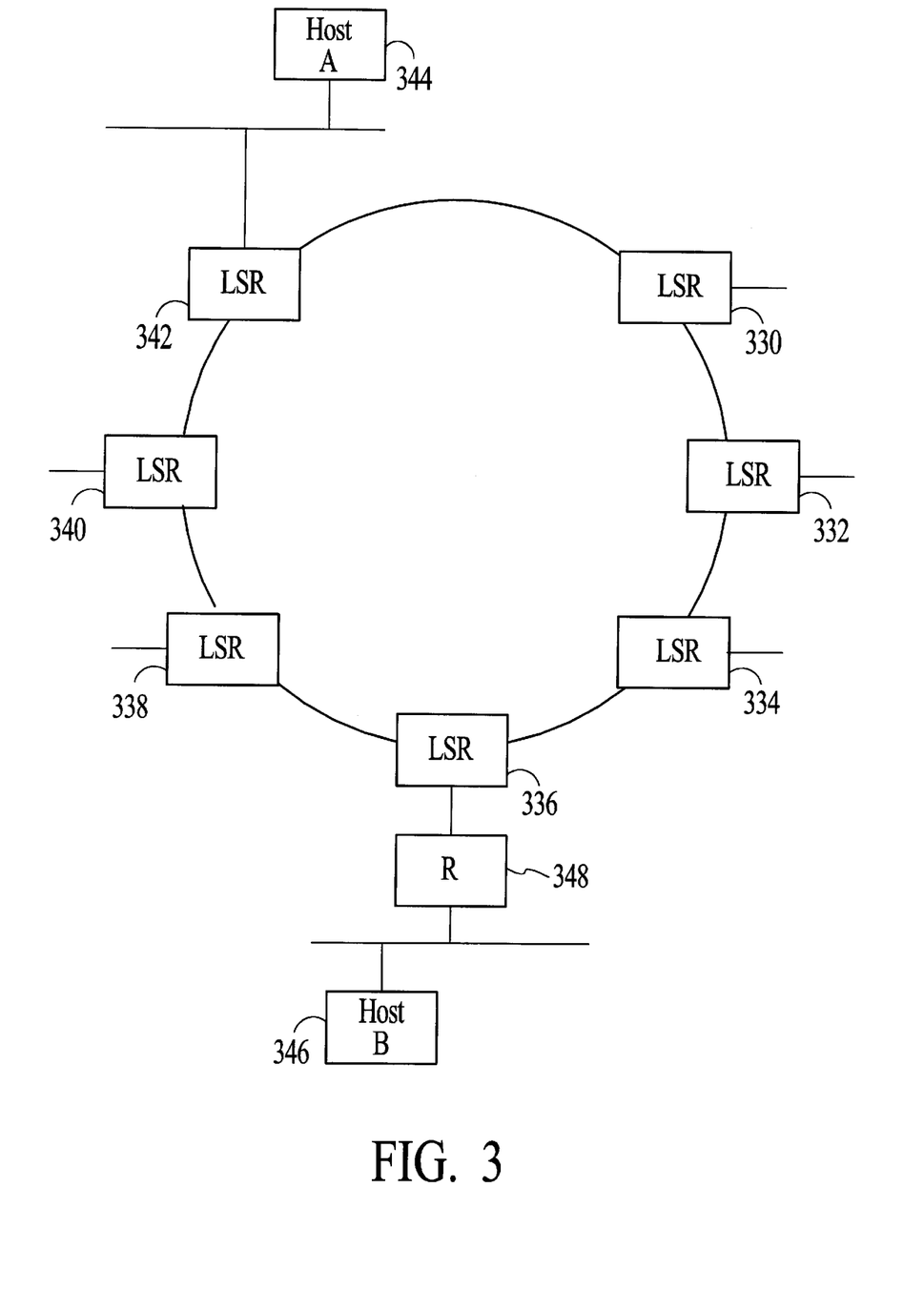
FIG. 3 depicts a group of LSRs that are connected by transmission links to form a ring.

FIG. 3 depicts a group of network nodes (330, 332, 334, 336, 338, 340, and 342) that are connected by transmission links to form a ring. In the embodiment of FIG. 3, all of the network nodes on the ring support label switching, for example, the MPLS protocol that is published by the IETF, and are referred to herein as label switch routers (LSRs). All of the LSRs on the ring form an MPLS domain. Each of the LSRs on the ring has a right side neighbor and a left side neighbor where for purposes of this description, left and right are defined at each LSR relative to a person standing at the LSR and facing the center of the ring. Each of the LSRs may be connected to other network nodes that are not part of the MPLS domain. For example, LSR 342 is connected to Host A 344 and LSR 336 is connected to Host B 346 through a non-MPLS enabled router 348.

In an embodiment, the LSRs 330–342 utilize Ethernet at the Data Link layer (layer 2) to transmit packets between the LSRs, although other protocols may be utilized. As described above, when a first Host attempts to send packets to a second Host whose location is unknown to the intermediate network nodes, a Data Link layer protocol such as Ethernet will utilize flooding to deliver the packets to the destination and then learn the route to the destination for subsequent packet transmissions. An example of flooding is described with respect to FIG. 3 for packets that are to be sent from Host A 344 to Host B 346, where the location of Host B is initially unknown to the LSRs. Referring to FIG. 3, Host A transmits packets, addressed to Host B, on all of its active ports. The packets transmitted from one of the Host A ports are received by the LSR 342. Assuming the LSR 342 has no knowledge of Host B in its look-up tables, the LSR 342 floods the packets onto all of its ports except for the port on which the packets were received. For purposes of this description, the LSRs on the ring are assumed to have at least a left ringport and a right ringport, with left and right being defined at each LSR relative to a person standing at the LSR and facing the center of the ring. Once the packets are flooded onto all of its ports (including the left and right ringports), the packets are received by the left and right neighbor LSRs. Assuming that the left and right neighbor LSRs have no knowledge of Host B, the left and right neighbor LSRs flood the packets onto all of their ports (except the ports on which the packets were received). The process of flooding continues at all of the LSRs around the ring until Host B is ultimately reached by flooding at LSR 336. Once Host B is reached, Host B sends packets back to Host A, which enables all of the intermediate network nodes to learn the location of Host B. The transmission of subsequent packets does not require the flooding of packets as long as the knowledge of Host B exists.

Although flooding the Host B packet ultimately locates Host B, the flooding also creates undesirable transmission loops on the ring of FIG. 3. A transmission loop is formed in the clockwise direction because the unknown packets are received on the right ringport of each LSR and then flooded to the left ringport in a continuous process. Likewise, a transmission loop is formed in the counterclockwise direction because the unknown packets are received on the left ringport of each LSR and then flooded to the right ringport in a continuous process. The frequency of flooding is proportional to the number of Hosts with access to the ring and therefore, as the number of Hosts increases, the formation of transmission loops can quickly overwhelm the LSRs on a ring.

In accordance with an embodiment of the invention, transmission loops are prevented from forming on a ring in which all of the nodes support label switching by transforming the topology of the ring into a series of arcs. Specifically, the physical topology of a ring is transformed into a series of logical arcs using the TTL field of the label switching header to limit the number of hops that packets can travel to the left and right of a particular LSR on a ring. For packets transmitted to the right and left of an LSR, the TTL value in the TTL field is decremented for each packet at each hop until the TTL value of a packet reaches a specified value. Once the TTL value of a packet reaches the specified value, the packet is not forwarded to a next hop and therefore transmission loops are prevented from forming. The MPLS protocol as described by the IETF (RFC 3032, January 2001) is used for example purposes throughout this description, although it should be understood that other label switching protocols that include a TTL field (or equivalent) may also be utilized to prevent transmission loops. Although the term "shim header" is used to describe the label switching label, the terms "label" or "label stack" can also be used in reference to any label switching protocol.

Figure 4:
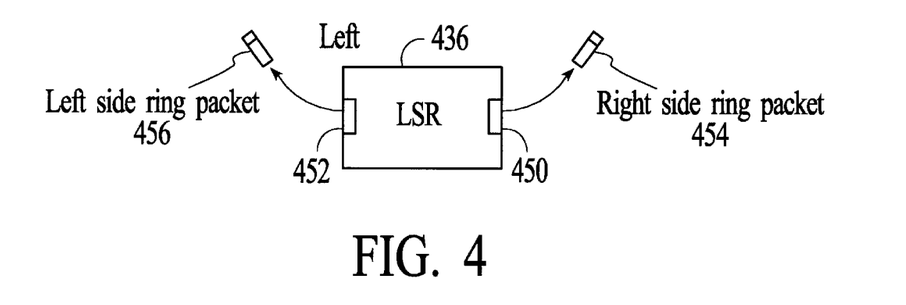
FIG. 4 depicts an LSR that is part of a ring topology and right and left side ring packets that are transmitted from the LSR.

FIG. 4 depicts an LSR 436 that is part of a ring topology. The LSR includes a right side ringport 450 and a left side ringport 452 from which right side and left side ring packets are transmitted, respectively. Example right side and left side ring packets 454 and 456 are described in detail with reference to FIGS. 5 and 6.

Figure 5:
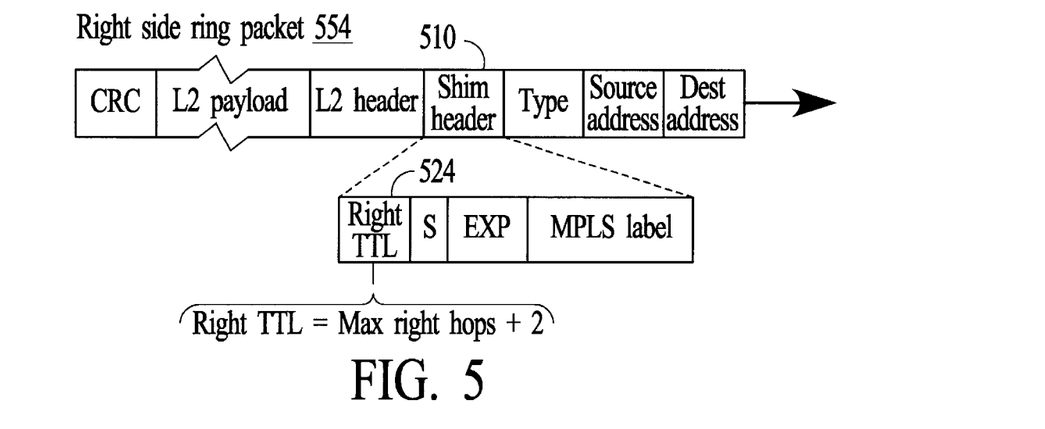
FIG. 5 depicts an expanded view of the right side ring packet that is depicted in FIG. 4, where the Shim header includes a right TTL value that transforms the physical topology of the ring into a logical arc in accordance with an embodiment of the invention.

FIG. 5 depicts an expanded view of a right side ring packet 554 that includes a shim header 510. The ring packet is similar to the packet described with reference to FIG. 2 except that the packet and the encapsulated inner packet are both layer 2 packets. As depicted in FIG. 5, the encapsulated inner packet includes a layer 2 header and a layer 2 payload and the shim header is located between the two layer 2 headers. The shim header includes a right TTL field 524 that is set to a right TTL value in order to transform the physical topology of the ring into a logical arc. Specifically, the right TTL value establishes the right portion of the arc. Logic for setting the right TTL value is described in detailed below. Throughout the description, similar reference numbers may be used to identify similar elements.

Figure 6:
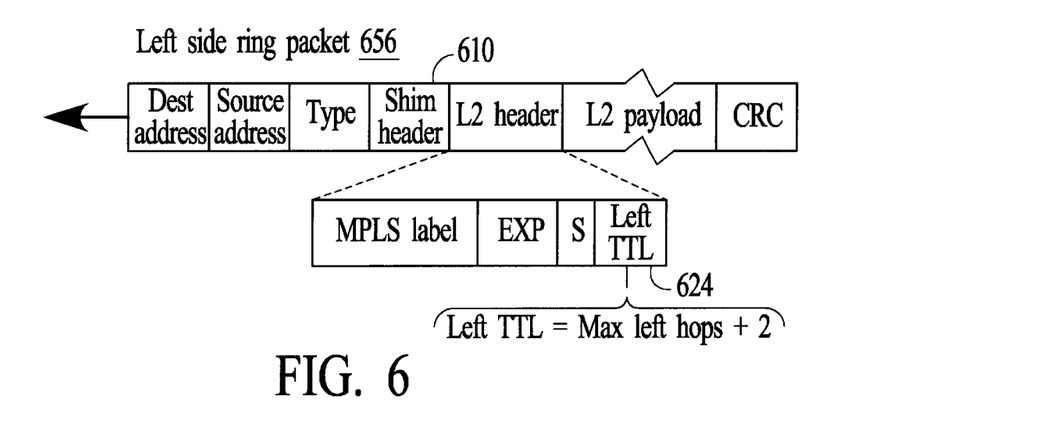
FIG. 6 depicts an expanded view of the left side ring packet that is depicted in FIG. 4, where the Shim header includes a left TTL value that transforms the physical topology of the ring into a logical arc in accordance with an embodiment of the invention.

FIG. 6 depicts an expanded view of a left side ring packet 656, similar to the packet described with reference to FIG. 5, that includes a shim header 610. The shim header includes a left TTL field 624 that is set to a left TTL value in order to transform the physical topology of the ring into a logical arc. Specifically, the left TTL value establishes the left portion of the arc. Logic for setting the left TTL value is described in detailed below.

Figure 7:
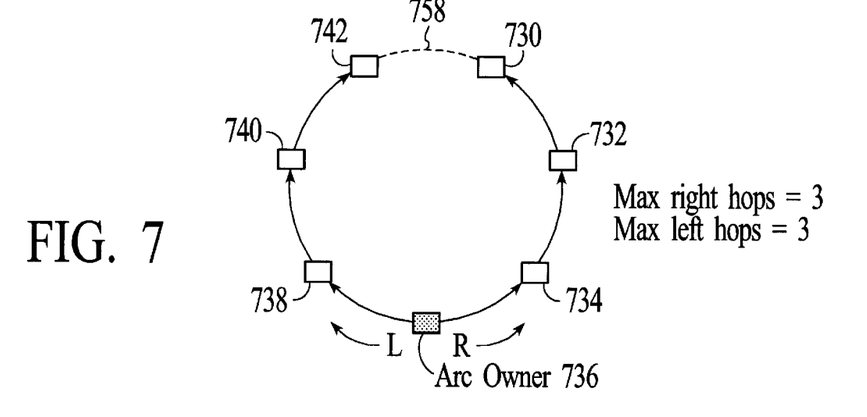
FIG. 7 depicts an Arc Owner and an arc that is established within a ring of LSRs that includes an odd number of LSRs in accordance with an embodiment of the invention.

A technique for setting the right and left TTL values in a manner that transforms the physical topology of a ring into a logical arc and prevents transmission loops is described with reference to FIG. 7. FIG. 7 depicts a group of LSRs 730–742 that are connected by transmission links to form a ring similar to the ring depicted in FIG. 3. In the ring of FIG. 7, all of the transmission links are operating transmission links, although as described below there may be instances where a particular link is temporarily unavailable. The total number of LSRs in the ring is defined as N and the loop prevention protocol is managed independently by each of the N LSRs. Each LSR is referred to herein as an Arc Owner with respect to packets that ingress into the MPLS domain from that LSR. That is, an LSR that receives packets from outside of the MPLS domain is considered the Arc Owner for those packets. For example purposes, the ring in FIG. 7 has seven LSRs (N=7) and arcs related to the Arc Owner 736 at the bottom of the ring are described herein. The same description applies to the other LSRs. Although the loop protection protocol is especially applicable to flooded, multicasted, broadcasted packets, the loop protection protocol is applicable to any ring packets.

In an embodiment of the invention, the general rule for preventing transmission loops in a ring topology is that the number of hops that a right side ring packet travels plus the number of hops that a left side ring packet travels must not exceed N−1. This rule can be expressed as:

$$\text{MaxRightHops} + \text{MaxLeftHops} \leq N-1$$

where MaxRightHops=the maximum number of hops that a right side ring packet travels, and MaxLeftHops=the maximum number of hops that a left side ring packet travels.

In an embodiment of MPLS, if the TTL value within an MPLS shim header (after being decremented at the receiving LSR) is 0 or 1, then the packet is not forwarded to the next hop. Taking into consideration the 0 and 1 values and in order to ensure that the last LSR on the arc is able to distribute the received packet to any subnetworks, the right TTL and left TTL values are determined by adding two to the MaxRightHops and MaxLeftHops values. The right and left TTL values can be expressed as:

$$\text{right TTL} = \text{MaxRightHops} + 2$$

$$\text{left TTL} = \text{MaxLeftHops} + 2$$

This algorithm for setting the right TTL and left TTL values is depicted in the expanded view of the Shim headers shown in FIGS. 5 and 6. In the embodiments of FIGS. 5 and 6, when an LSR receives a packet with a TTL value of 2 in its shim header, the TTL value is decremented by the receiving LSR and because the TTL value is now 1, the packet is not forwarded to the next ringport.

Following the general rule of MaxRightHops+MaxLeftHops≤N−1 and referring to FIG. 7, one embodiment of an arc is established by setting MaxRightHops=3 and MaxLeftHops=3. With these settings of MaxRightHops and MaxLeftHops a balanced arc is created. Given MaxRightHops=3 and MaxLeftHops=3, the right and left TTL values are both 5. As shown in FIG. 7, the unused transmission link 758 is three hops to the right and three hops to the left of the Arc Owner 736. An algorithm for creating a balanced arc when N is an odd number is;

$$\text{MaxRightHops} = \text{MaxLeftHops} = (N-1)/2$$

and a corresponding algorithm for generating the right and left TTL values is;

$$\text{right TTL} = \text{left TTL} = (N-1)/2 + 2$$

Figure 8:
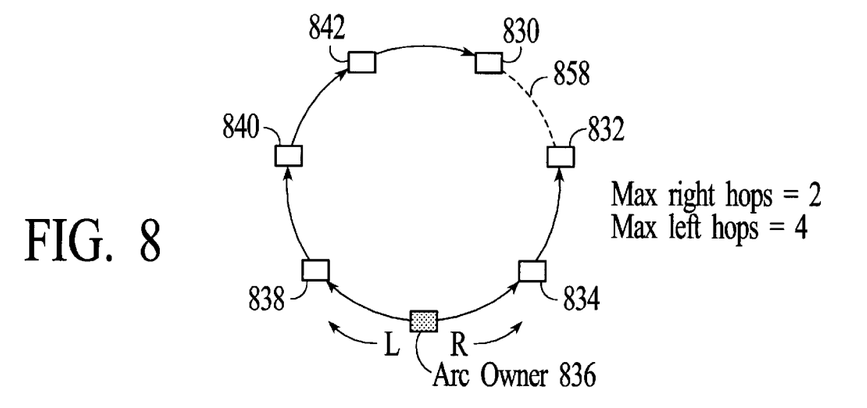
FIG. 8 depicts another Arc Owner and an arc that is established within a ring of LSRs that includes an odd number of LSRs in accordance with an embodiment of the invention.
Figure 9:
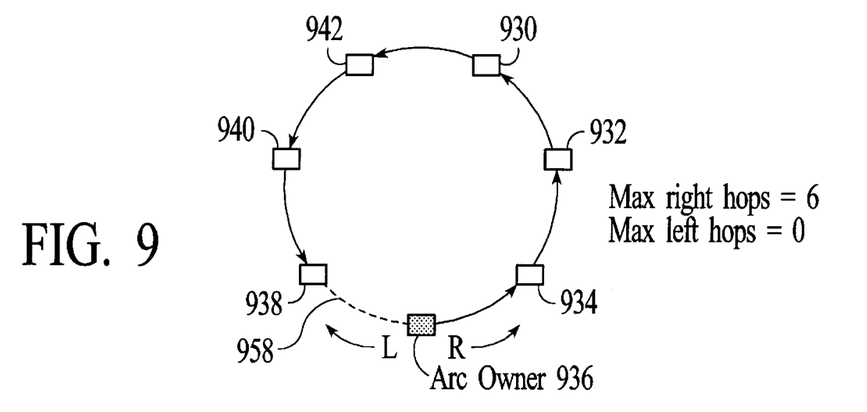
FIG. 9 depicts another Arc Owner and an arc that is established within a ring of LSRs that includes an odd number of LSRs in accordance with an embodiment of the invention.

Other embodiments of an arc can be established by setting the MaxRightHops and MaxLeftHops values to other combinations of values that still follow the general rule of MaxRightHops+MaxLeftHops≤N−1. FIG. 8 depicts an embodiment of an arc that is established by setting MaxRightHops=2 and MaxLeftHops=4. As depicted in FIG. 8, the location of the unused transmission link 858 in the arc has rotated clockwise one link from the location of the unused transmission link 758 in FIG. 7. FIG. 9 depicts an embodiment of an arc that is established by setting MaxRightHops=6 and MaxLeftHops=0. As depicted in FIG. 9, the location of the unused transmission link 958 in the arc is located directly next to the left side of the Arc Owner 936. When the unused transmission link is located directly next to the Arc Owner, packets are only sent out on one of the ringports.

Figure 10:
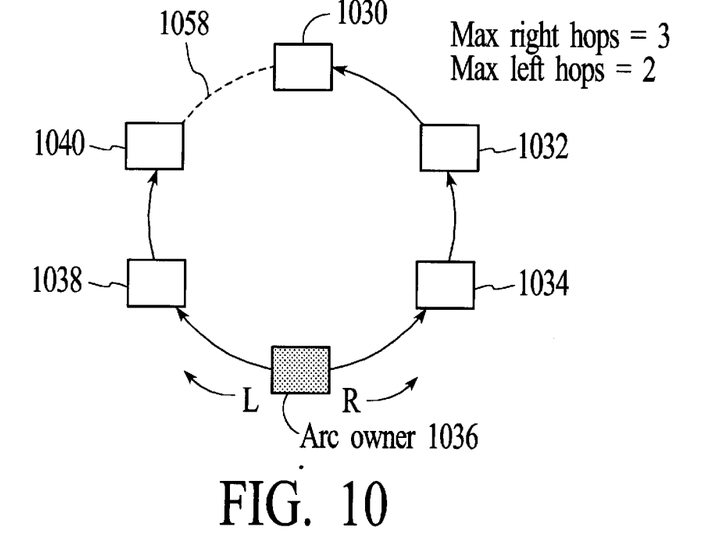
FIG. 10 depicts another Arc Owner and an arc that is established within a ring of LSRs that includes an even number of LSRs in accordance with an embodiment of the invention.

When the number of LSRs, N, on the ring is an odd number, the MaxRightHops and MaxLeftHops can be balanced as depicted in FIG. 7. When the number of LSRs, N, on the ring is an even number, the MaxRightHops and MaxLeftHops are unbalanced when the arc includes all of the LSRs. FIG. 10 depicts a ring with six LSRs (N=6) and an arc that is established by setting MaxRightHops=3 and MaxLeftHops=2. With these settings of MaxRightHops and MaxLeftHops, an unbalanced arc is created such that the unused transmission link 1058 is an unequal number of hops from the Arc Owner. Upon adding two hop values to the MaxRightHops and MaxLeftHops the right TTL value is 5 and the left TTL value is 4. An algorithm for creating an arc when N is an even number is;

$$MaxRightHops=[(N-1)/2]+1$$

$$MaxLeftHops=(N-1)/2$$

and a corresponding algorithm for generating the right and left TTL values is;

$$right\ TTL=(N-1)/2+3$$

$$left\ TTL=(N-1)/2+2$$

Figure 11:
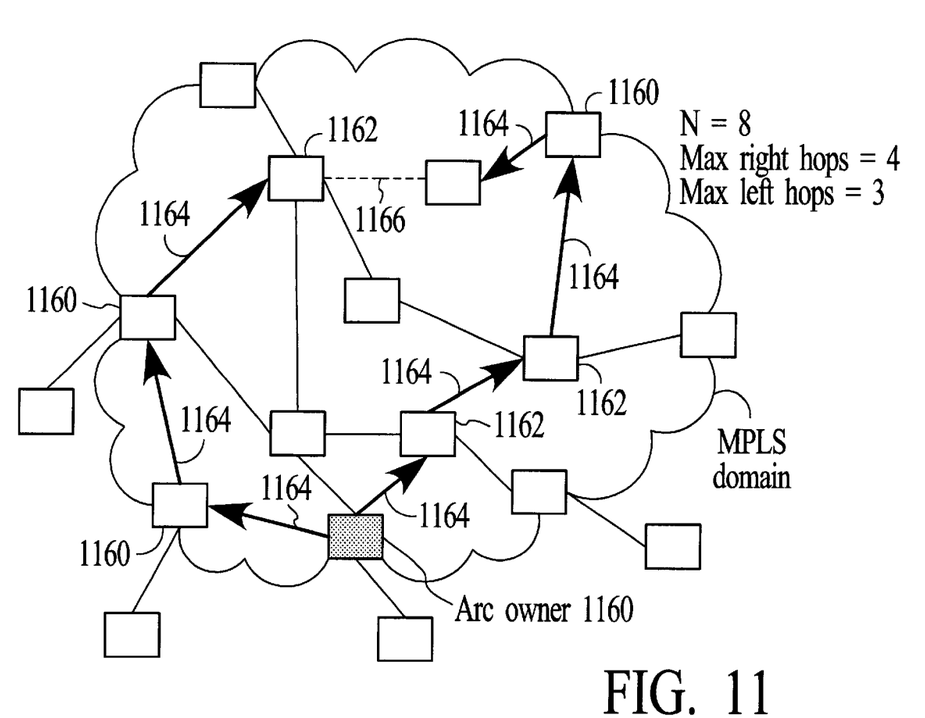
FIG. 11 depicts an arc that is established at an Arc Owner within a ring of LSRs that are part of a mesh network of LSRs in accordance with an embodiment of the invention.

Although a group of LSRs have been described and depicted in a circular ring topology, it should be understood that a ring of LSRs can be created in a mesh network of LSRs as long as all of the LSRs are within a label switching domain. FIG. 11 depicts a ring of LSRs that is created within an MPLS domain that includes LSRs that are not part of the ring. In the embodiment of FIG. 11, some of the ring LSRs are edge LSRs 1160 and other ring LSRs are interior LSRs 1162. The ring is created by the group of LSRs (where N=8) that are connected by transmission links 1164 and transmission link 1166. For example purposes, the Arc Owner is identified as the darkened LSR 1160. One embodiment of a logical arc is established by setting MaxRightHops=4 and MaxLeftHops=3, which leaves transmission link 1166 as the unused transmission link. Packets that enter the MPLS domain at the Arc Owner LSR are flooded on the right side ringport with MaxRightHops=4 (right TTL=6) and are flooded on the left side ringport with MaxLeftHops=3 (left TTL=5).

As stated above, each Arc Owner in an established ring operates independently to control the topologies of the logical arcs that it creates. Different criteria can be used by an Arc Owner to determine the best values for MaxRightHops and MaxLeftHops. In an embodiment, the MaxRightHops and MaxLeftHops are set so that the number of hops is balanced as described with reference to FIG. 7.

In an embodiment, the MaxRightHops and MaxLeftHops are set so that the furthest transmission link from the Arc Owner is the unused link. The furthest transmission link may be defined in terms of the amount of time required to reach the unused transmission link or the distance between the Arc Owner and the last two LSRs on the arc.

In an embodiment, the MaxRightHops and the MaxLeftHops are set based on performance characteristics of the transmission links that make up the ring. For example, a poor performing link may be selected as the unused link. Performance of a link may be measured by, for example, the transmission rate, the bit error rate (BER), traffic patterns, etc. In an embodiment, a transmission link may be selected as the unused link because the link is down for maintenance.

In another embodiment, the MaxRightHops and MaxLeftHops are set based on the cost of transmitting information across the transmission link. For example, a relatively expensive link may be selected as the unused link in order to reduce transmission costs. The criteria used to set the MaxRightHops and MaxLeftHops can be based on any combination of the above-identified criteria and the setting of MaxRightHops and MaxLeftHops can be dynamically adjusted to account for changing conditions. That is, the logical arc of an Arc Owner can be rotated as needed to avoid the use of a particular transmission link.

The MaxRightHops and MaxLeftHops can also be changed to adapt to an unexpected failure of a transmission link. For example, if a link that is being utilized by the Arc Owner suddenly fails, the MaxRightHops and MaxLeftHops can be quickly changed to rotate the logical arc such that the failed transmission link is the unused transmission link. Referring to FIGS. 7 and 8 for example purposes, the arc shown in FIG. 7 is established as the active arc by the Arc Owner. If the transmission link that is one link to the left (one transmission link in the clockwise direction) suddenly fails, then the arc can be quickly rotated by adjusting the right and left TTLs to establish the failed transmission link as the unused transmission link as shown in FIG. 8. In the case where one of the links fails (for example when a fiber optic cable is cut), all of the Arc Owners on the ring will rotate their arcs to avoid the failed transmission link by adjusting their respective MaxRightHops and MaxLeftHops values.

Figure 12:
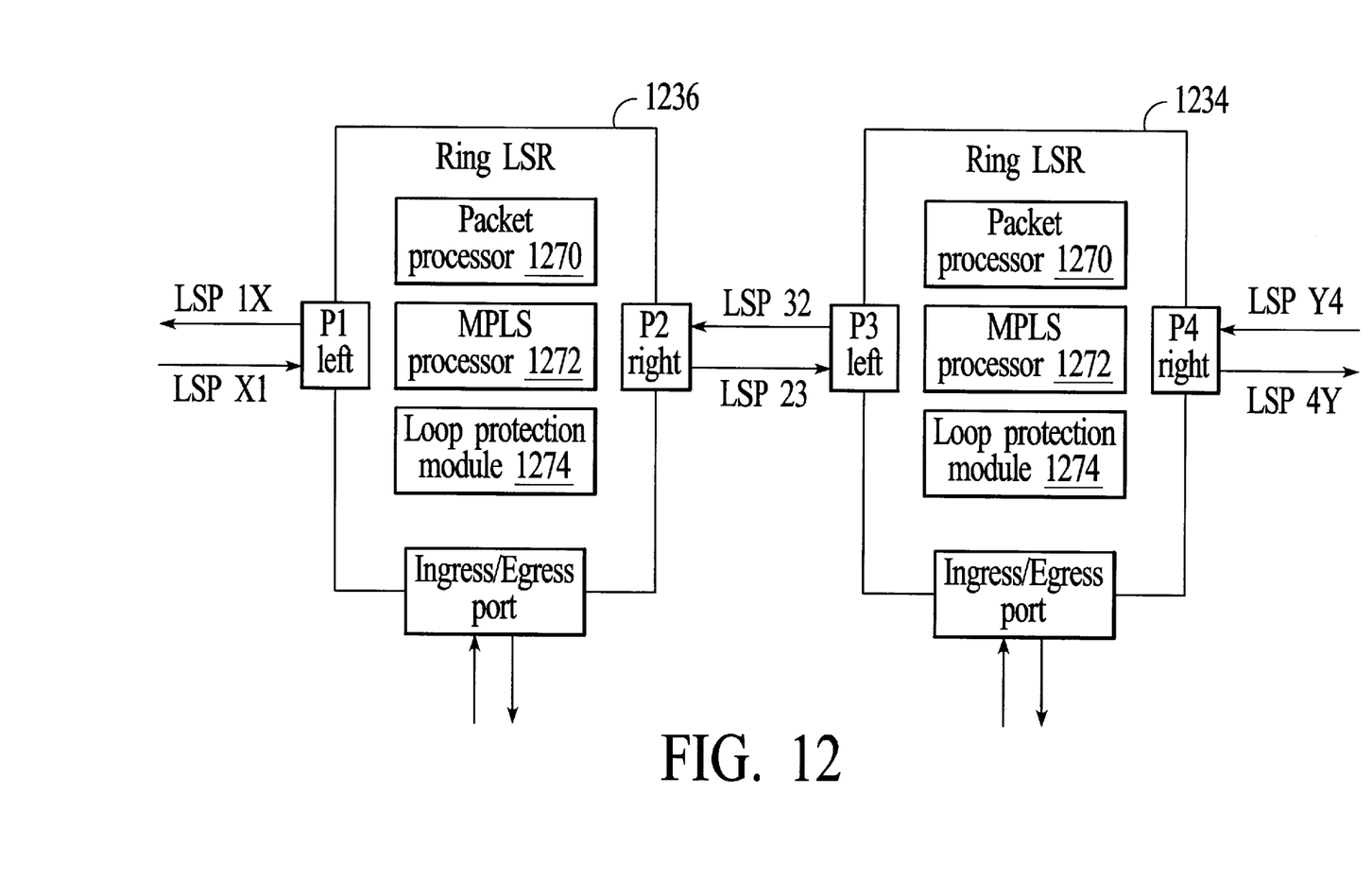
FIG. 12 depicts an expanded view of two LSRs that are adjacent to each other on a ring.

FIG. 12 depicts an expanded view of two LSRs 1234 and 1236 that are adjacent to each other on a ring. Each LSR includes a right side ringport (P2 and P4), a left side ringport (P1 and P3), a packet processor 1270, an MPLS processor 1272, and a loop protection module 1274. Each port of each LSR has at least one incoming and one outgoing unidirectional LSP associated with the ring. For example, the LSP that is used to transmit packets from P2 to P3 is identified as LSP 23 and the LSP that is used to transmit packets from P3 to P2 is identified as LSP 32. In an embodiment, LSPs are only established between neighbor ringports. In addition to the ringports, the LSR may include an ingress/egress port, or ports, that connects the LSR to network nodes that are not within the MPLS domain.

The packet processors 1270 manage the packets that are switched within the LSRs. Specifically, the packet processors handle the Data Link layer and Network layer functions that are carried out by the LSRs. The packet processors identify which ingress packets must be flooded and the packet processors generate the right side ring packets and the left side ring packets that are used for flooding. Likewise, the packet processors manage the processing of multicast and broadcast packets.

The MPLS processors 1272 manage the MPLS functions of the LSR. Specific functions of the MPLS processors include generating the shim headers for packets, establishing forwarding equivalency classes (FECs), decrementing the MPLS TTL values, providing label values, and maintaining a label information base. In an embodiment of the invention, the function of penultimate hop popping is disabled so that continuity of the right and left TTL values is maintained within the arcs.

The loop protection modules 1274 manage the loop prevention functions that are described above with reference to FIGS. 3–11. In an embodiment, all LSRs on the ring must include the loop protection module to ensure that loop protection is properly carried out. Specific functions of the loop protection modules include learning the topology of the ring, establishing adjacency with neighbor LSRs, determining the MaxRightHops and MaxLeftHops for packets (including flooded, multicast, and broadcast packets), and setting the right and left TTL values for packets.

One function of the loop protection modules 1274 is to learn the topology of the ring. Many different protocols can be used by ring LSRs to communicate topology information to other LSRs on the ring. In an embodiment, each LSR on the ring sends periodic advertisement messages to its left and right neighbors with information regarding the topology of the ring. Information included within the advertisement messages may include; the number (N) of LSRs on the ring, the MAC addresses of LSRs on the ring, the MaxRightHops and MaxLeftHops values for LSRs on the ring, the type of links that are to the right and left of the LSRs, and left and right side traffic information for the LSRs on the ring.

Another function of the loop protection modules 1274 is to stitch TTL values for incoming packets to the decremented TTL values for the same outgoing packets. That is, the TTL value of a ring packet at the output port of an LSR should be the decremented value of the TTL value for the same packet at the input port of the LSR. Referring to FIG. 12 for example, the TTL value of a ring packet received at port P3 and traveling from LSP 23 to LSP 4Y on port 4 is decremented when it is received at port P3. The decremented TTL value is carried through the LSR and is included within the ring packet when the ring packet is transmitted from port 4. The right and left TTL values for ring packets must be decremented at every hop. The loop protection module ensures that the TTL values of ring packets are decremented when the ring packets are received and that the TTL values are stitched across the ring LSRs before the ring packets are output on the next LSP. In an embodiment, the TTL stitching is performed by a hardware device.

Figure 13:
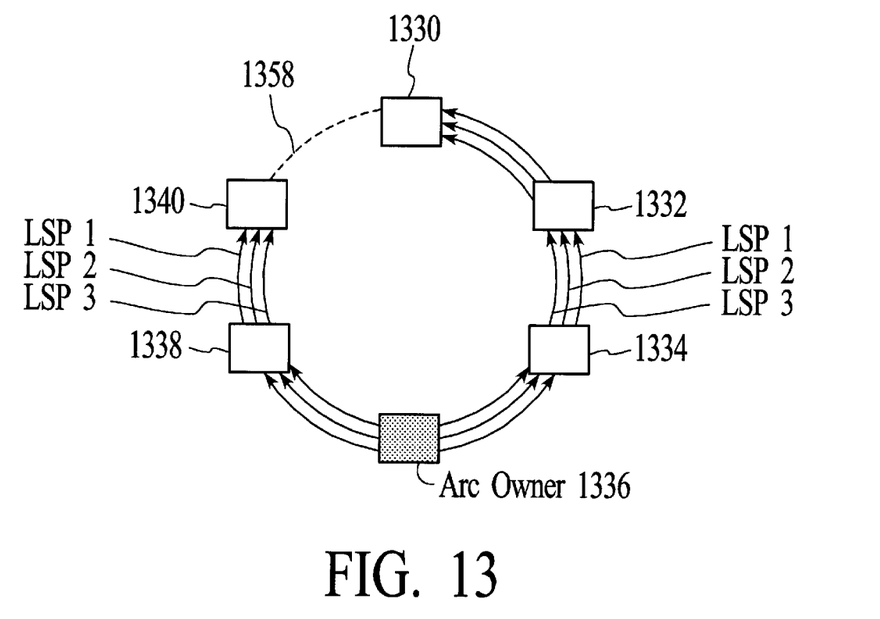
FIG. 13 depicts an Arc Owner that has three different LSPs, representing three different qualities of service, that are maintained on the same logical arc in accordance with an embodiment of the invention.

In an embodiment of the loop protection protocol, an Arc Owner LSR can have multiple unidirectional LSPs that are controlled by the LSR. For example, an Arc Owner LSR can have multiple LSPs, with each LSP representing a different quality of service (QoS). FIG. 13 represents an Arc Owner that has three different LSPs (LSP 1, LSP 2, and LSP 3) originating from the Arc Owner, with each LSP representing a different QoS. In an embodiment, the Arc Owner maintains all of the LSPs on the same logical arc. Maintaining all of the LSPs on the same logical arc allows the Arc Owner to simply and efficiently manage the LSPs.

Figure 14:
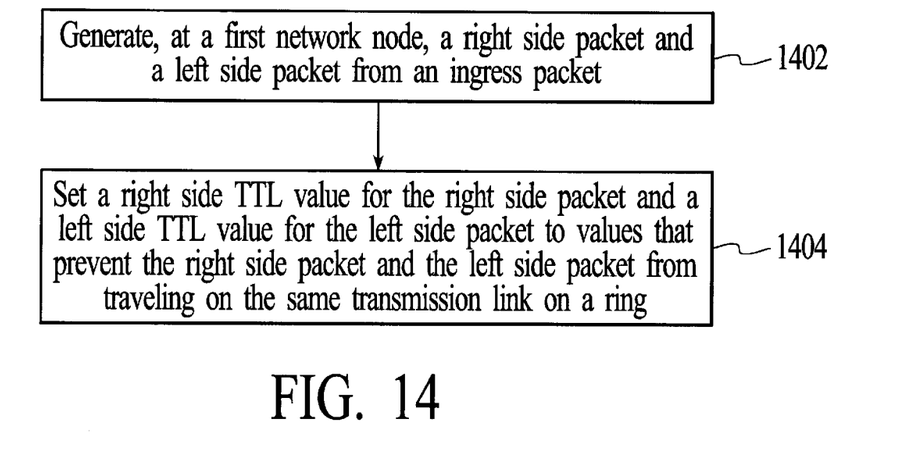
FIG. 14 is a process flow diagram of a method for preventing transmission loops between a plurality of network nodes in accordance with an embodiment of the invention.

FIG. 14 is a process flow diagram of a method for preventing transmission loops between a plurality of network nodes that are connected by transmission links to form a ring, wherein each network node on the ring includes a right side ringport that is connected to a right side neighbor and a left side ringport that is connected to a left side neighbor and wherein each of the network nodes in the ring utilizes a label switching protocol that includes a label, the label including a label field for carrying a label value and a time-to-live (TTL) field for carrying a TTL value. At step 1402, at a first one of the plurality of network nodes, a right side packet and a left side packet are generated from an ingress packet. At step 1404, right side and left side TTL values are set for the right and left side packets to values that prevent the right and left side packets from traveling on the same transmission link on a ring.

Figure 15:
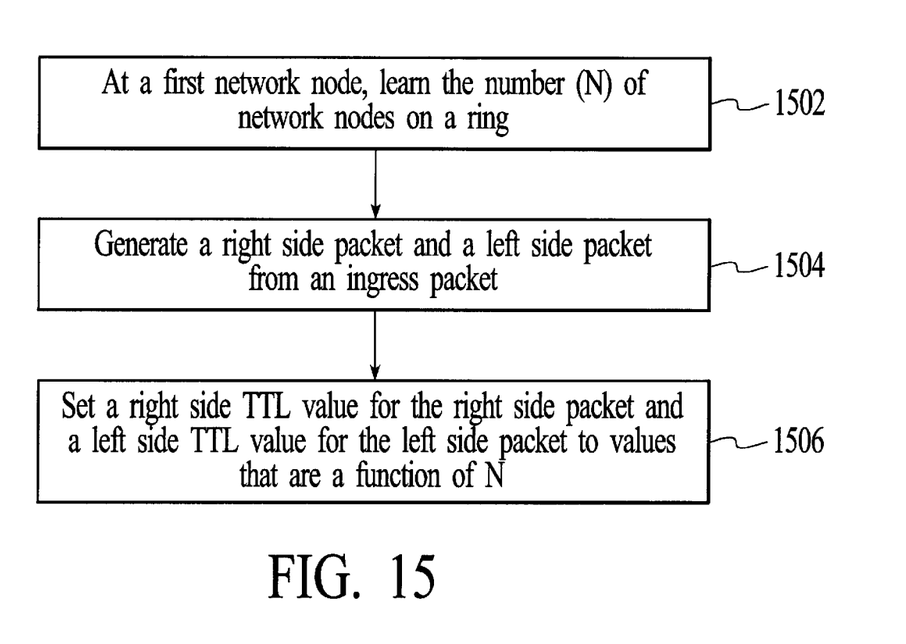
FIG. 15 is a process flow diagram of another method for preventing transmission loops between a plurality of network nodes in accordance with an embodiment of the invention.

FIG. 15 is a process flow diagram of a method for preventing transmission loops between a plurality of network nodes that are connected by transmission links to form a ring, wherein each network node on the ring includes a right side ringport that is connected to a right side neighbor and a left side ringport that is connected to a left side neighbor and wherein each of the network nodes in the ring utilizes a label switching protocol that includes a label, the label including a label field for carrying a label value and a time-to-live (TTL) field for carrying a TTL value. A step 1502, a first one of the plurality of network nodes learns the number (N) of network nodes on the ring. At step 1504, right side and left side packets are generated from an ingress packet. At step 1506, right side and left side TTL values are set for the right and left side packets to values that are a function of N.

Figure 16:
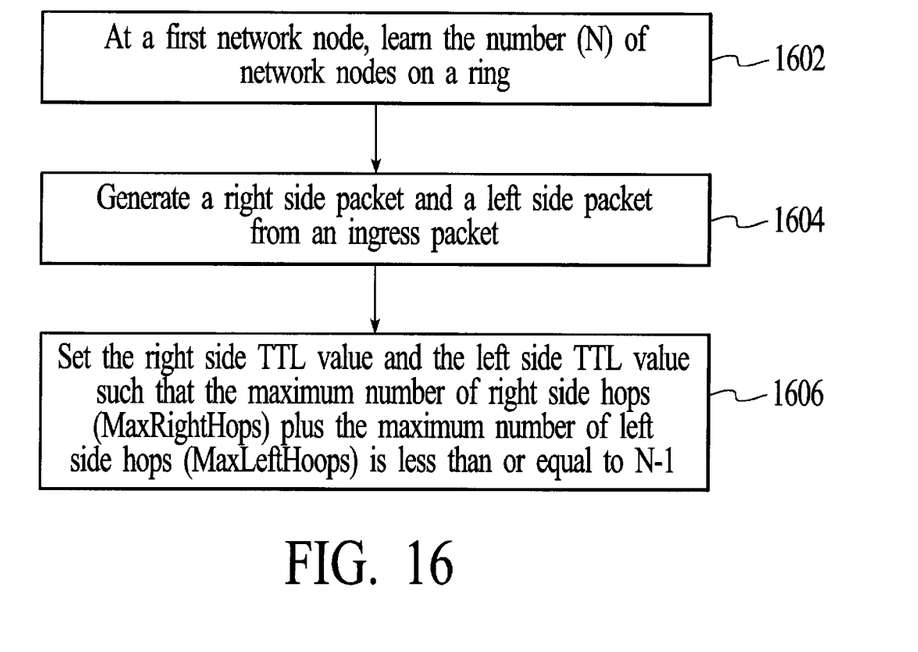
FIG. 16 is a process flow diagram of another method for preventing transmission loops between a plurality of network nodes in accordance with an embodiment of the invention.

FIG. 16 is a process flow diagram of a method for preventing transmission loops between a plurality of network nodes that are connected by transmission links to form a ring, wherein each network node on the ring includes a right side ringport that is connected to a right side neighbor and a left side ringport that is connected to a left side neighbor and wherein each of the network nodes in the ring utilizes a label switching protocol that includes a label, the label including a label field for carrying a label value and a time-to-live (TTL) field for carrying a TTL value. A step 1602, a first one of the plurality of network nodes learns the number (N) of network nodes on the ring. At step 1604, right side and left side packets are generated from an ingress packet. At step 1606, right side and left side TTL values are set for the right and left side packets such that the maximum number of right side hops (MaxRightHops) plus the maximum number of left side hops (MaxLeftHops) is less than or equal to N−1.

What is claimed is:

1. A method for preventing transmission loops between a plurality of network nodes that are connected by transmission links to form a ring, wherein each network node on said ring includes a right side ringport that is connected to a right side neighbor and a left side ringport that is connected to a left side neighbor and wherein each of said network nodes in said ring utilizes a label switching protocol that includes a label, said label including a label field for carrying a label value and a time-to-live (TTL) field for carrying a TTL value, said method comprising:

generating, at a first one of said plurality of network nodes, a right side packet and a left side packet from an ingress packet; and setting a right side TTL value for said right side packet and a left side TTL value for said left side packet to values that prevent said right side packet and said left side packet from traveling on the same transmission link on said ring.

2. The method of claim 1 further including a step of learning the number (N) of network nodes on said ring.

3. The method of claim 2 wherein said step of setting said right side TTL value and said left side TTL value includes a step of setting said right side TTL value and said left side TTL value to values that are a function of N.

4. The method of claim 3 wherein said step of setting said right side TTL value and said left side TTL value includes a step of setting said right side TTL value and said left side TTL value such that the maximum number of right side hops (MaxRightHops) plus the maximum number of left side hops (MaxLeftHops) is less than or equal to N−1, said function of N being expressed as:

$$\text{MaxRightHops} + \text{MaxLeftHops} \leq N-1.$$

5. The method of claim 1 wherein said step of setting said right side TTL value and said left side TTL value includes a step of setting said right side TTL value and said left side TTL value such that the number of hops for the right side packet is equal to the number hops for the left side packet.

6. The method of claim 1 wherein said step of setting said right side TTL value and said left side TTL value includes a step of setting said right side TTL value and said left side TTL value such that the number of hops for the right side packet differs from the number hops for said left side packet by one hop.

7. The method of claim 1 wherein said step of setting said right side TTL value and said left side TTL value includes a step of setting said right side TTL value and said left side TTL value such that the furthest transmission link from said first network node is a transmission link that is not utilized by either said right side packet or left side packet.

8. The method of claim 1 wherein said step of setting said right side TTL value and said left side TTL value includes a step of setting said right side TTL value and said left side TTL value in response to link performance information related to said transmission links that connect said network nodes into said ring.

9. The method of claim 1 further including a step of dynamically adjusting said right side and left side TTL values.

10. The method of claim 1 further including a step of transmitting said right side packet on said right side ringport of said first network node and said left side packet on said left side ringport of said first network node.

11. The method of claim 10 further including a step of decrementing said right side TTL value of said right side packet at each network node on said ring that receives said right side packet and said left side TTL value of said left side packet at each network node on said ring that receives said left side packet.

12. The method of claim 1 wherein said label is located between two Data Link layer headers.

13. The method of claim 1 wherein said network nodes utilize Ethernet at the Data Link layer.

14. The method of claim 1 wherein said label is a Multiprotocol Label Switching (MPLS) header.

15. The method of claim 14 further including:
establishing, at said first network node, multiple label switch paths that have different quality of service characteristics; and
setting the same right side TTL values and left side TTL values for all packets transmitted on said multiple LSPs.

16. A method for preventing transmission loops between a plurality of network nodes that are connected by transmission links to form a ring, wherein each network node on said ring includes a right side ringport that is connected to a right side neighbor and a left side ringport that is connected to a left side neighbor and wherein each of said network nodes in said ring utilizes a label switching protocol that includes a label, said label including a label field for carrying a label value and a time-to-live (TTL) field for carrying a TTL value, said method comprising:
learning, at a first one of said plurality of network nodes, the number (N) of network nodes on said ring;
generating, at said first network node, a right side packet and a left side packet from an ingress packet; and
setting a right side TTL value for said right side packet and a left side TTL value for said left side packet to values that are a function of N.

17. The method of claim 16 wherein said step of setting said right side TTL value and said left side TTL value includes a step of setting said right side TTL value and said left side TTL value to values that prevent said right side packet and said left side packet from traveling on the same transmission link on said ring.

18. The method of claim 16 wherein said step of setting said right side TTL value and said left side TTL value includes a step of setting said right side TTL value and said left side TTL value such that the maximum number of right side hops (MaxRightHops) plus the maximum number of left side hops (MaxLeftHops) is less than or equal to N−1, said function of N being expressed as:

$$MaxRightHops+MaxLeftHops \leq N-1.$$

19. The method of claim 16 wherein said step of setting said right side TTL value and said left side TTL value includes a step of setting said right side TTL value and said left side TTL value such that the furthest transmission link from said first network node is a transmission link that is not utilized by either said right side packet or left side packet.

20. The method of claim 16 wherein said step of setting said right side TTL value and said left side TTL value includes a step of setting said right side TTL value and said left side TTL value in response to link performance information related to said transmission links that connect said network nodes into said ring.

21. The method of claim 16 further including a step of dynamically adjusting said right side and left side TTL values.

22. The method of claim 16 further including a step of transmitting said right side packet on said right side ringport of said first network node and said left side packet on said left side ringport of said first network node.

23. The method of claim 22 further including a step of decrementing said right side TTL value of said right side packet at each network node on said ring that receives said right side packet and said left side TTL value of said left side packet at each network node on said ring that receives said left side packet.

24. The method of claim 16 wherein said label is located between two Data Link layer headers.

25. The method of claim 16 wherein said network nodes utilize Ethernet at the Data Link layer.

26. The method of claim 16 wherein said label is a Multiprotocol Label Switching (MPLS) header.

27. The method of claim 16 further including:
establishing, at said first network node, multiple label switch paths that have different quality of service characteristics; and
setting the same right side TTL values and left side TTL values for all packets transmitted on said multiple LSPs.

28. A system for preventing transmission loops in a ring network comprising:
a plurality of network nodes that are connected by transmission links to form a ring, wherein each of said network nodes on said ring utilizes a label switching protocol that includes a label, said label including a label field for carrying a label value and a time-to-live (TTL) field for carrying a TTL value, each of said network nodes including:
a right side ringport that is connected to a right side neighbor;
left side ringport that is connected to a left side neighbor;
a packet processor for generating a right side packet and a left side packet from an ingress packet; and a loop protection module for setting a right side TTL value for said right side packet and a left side TTL value for said left side packet to values that prevent said right side packet and said left side packet from traveling on the same transmission link on said ring.

29. The system of claim 28 wherein said loop protection module includes means for learning the number (N) of network nodes on said ring.

30. The system of claim 29 wherein said loop protection module includes means for setting said right side TTL value and said left side TTL value to values that are a function of N.

31. The system of claim 30 wherein said loop protection module includes means for setting said right side TTL value and said left side TTL value such that the maximum number of right side hops (MaxRightHops) plus the maximum number of left side hops (MaxLeftHops) is less than or equal to N−1, said function of N being expressed as:

MaxRightHops+MaxLeftHops≦N−1.

32. The system of claim 28 wherein said loop protection module includes means for setting said right side TTL value and said left side TTL value such that the furthest transmission link from said first network node is the transmission link that is not utilized by either said right side packet or left side packet.

33. The system of claim 28 wherein said step loop protection module includes means for setting said right side TTL value and said left side TTL value in response to link performance information related to said transmission links that connect said network nodes into said ring.

34. The system of claim 28 wherein said loop protection module includes means for dynamically adjusting said right and left side TTL values.

35. The system of claim 28 wherein said right side ringport of a first network node transmits said right side packet and wherein said left side ringport of said first network node transmits said left side packet.

36. The system of claim 35 further including means for decrementing said right side TTL value of said right side packet at each network node on said ring that receives said right side packet and said left side TTL value of said left side packet at each network node on said ring that receives said left side packet.

37. The system of claim 28 wherein said label is located between two Data Link layer headers.

38. The system of claim 28 wherein said network nodes utilize Ethernet at the Data Link layer.

39. The system of claim 28 wherein said label is a Multiprotocol Label Switching (MPLS) header.

40. A system for preventing transmission loops in a ring network comprising:
- a plurality of network nodes that are connected by transmission links to form a ring, wherein each of said network nodes on said ring utilizes a label switching protocol that includes a label, said label including a label field for carrying a label value and a time-to-live (TTL) field for carrying a TTL value, each of said network nodes including;
  - a right side ringport that is connected to a right side neighbor;
  - a left side ringport that is connected to a left side neighbor;
  - a packet processor for generating a right side packet and a left side packet from an ingress packet; and
  - a loop protection module for learning the number (N) of network nodes on said ring and for setting a right side TTL value for said right side packet and a left side TTL value for said left side packet to values that are a function of N.

41. The system of claim 40 wherein said loop protection module includes means for setting said right side TTL value and said left side TTL value to values that prevent said right side packet and said left side packet from traveling on the same transmission link on said ring.

42. The system of claim 40 wherein said loop protection module includes means for setting said right side TTL value and said left side TTL value such that the maximum number of right side hops (MaxRightHops) plus the maximum number of left side hops (MaxLeftHops) is less than or equal to N−1, said function of N being expressed as:

MaxRightHops+MaxLeftHops≦N−1.

43. The system of claim 40 wherein said loop protection module includes means for setting said right side TTL value and said left side TTL value such that the furthest transmission link from said first network node is the transmission link that is not utilized by either said right side packet or left side packet.

44. The system of claim 40 wherein said step loop protection module includes means for setting said right side TTL value and said left side TTL value in response to link performance information related to said transmission links that connect said network nodes into said ring.

45. The system of claim 40 wherein said loop protection module includes means for dynamically adjusting said right and left said TTL values.

46. The system of claim 40 wherein said right side ringport of a first network node transmits said right side packet and wherein said left side ringport of said first network node transmits said left side packet.

47. The system of claim 46 wherein said loop protection module includes means for decrementing said right side TTL value of said right side packet at each network node on said ring that receives said right side packet and said left side TTL value of said left side packet at each network node on said ring that receives said left side packet.

48. The system of claim 40 wherein said label is located between two Data Link layer headers.

49. The system of claim 40 wherein said network nodes utilize Ethernet at the Data Link layer.

50. The system of claim 40 wherein said label is a Multiprotocol Label Switching (MPLS) header.

51. A system for preventing transmission loops between a plurality of network nodes that are connected by transmission links to form a ring, wherein each network node on said ring includes a right side ringport that is connected to a right side neighbor and a left side ringport that is connected to a left side neighbor and wherein each of said network nodes in said ring utilizes a label switching protocol that includes a label, said label including a label field for carrying a label value and a time-to-live (TTL) field for carrying a TTL value, said system comprising:
- a packet processor, located within a first one of said plurality of network nodes, for generating a right side packet and a left side packet from an ingress packet; and
- a loop protection module, located within said first network node, for setting a right side TTL value for said right side packet and a left side TTL value for said left side packet to values that prevent said right side packet and said left side packet from traveling on the same transmission link on said ring.

52. The system of claim 51 wherein said loop protection module includes means for learning the number (N) of network nodes on said ring.

53. The system of claim 52 wherein said loop protection module includes means for setting said right side TTL value and said left side TTL value to values that are a function of N.

54. The system of claim 53 wherein said loop protection module includes means for setting said right side TTL value and said left side TTL value such that the maximum number of right side hops (MaxRightHops) plus the maximum number of left side hops (MaxLeftHops) is less than or equal to N−1, said function of N being expressed as:

MaxRightHops+MaxLeftHops≦N−1.

55. The system of claim 51 further including means for setting said right side TTL value and said left side TTL value such that the furthest transmission link from said first network node is the transmission link that is not utilized by either said right side packet or left side packet.

56. The system of claim 51 wherein said step loop protection module includes means for setting said right side TTL value and said left side TTL value in response to link performance information related to said transmission links that connect said network nodes into said ring.

57. The system of claim 51 wherein said loop protection module includes means for dynamically adjusting said right and left side TTL values.

58. The system of claim 51 wherein said right side ringport of a first network node transmits said right side packet and wherein said left side ringport of said first network node transmits said left side packet.

59. The system of claim 58 wherein said loop protection module includes means for decrementing said right side TTL value of said right side packet at each network node on said ring that receives said right side packet and said left side TTL value of said left side packet at each network node on said ring that receives said left side packet.

60. The system of claim 51 wherein said label is located between two Data Link layer headers.

61. The system of claim 51 wherein said network nodes utilize Ethernet at the Data Link layer.

62. The system of claim 51 wherein said label is a Multiprotocol Label Switching (MPLS) header.

63. A system for preventing transmission loops between a plurality of network nodes that are connected by transmission links to form a ring, wherein each network node on said ring includes a right side ringport that is connected to a right side neighbor and a left side ringport that is connected to a left side neighbor and wherein each of said network nodes in said ring utilizes a label switching protocol that includes a label, said label including a label field for carrying a label value and a time-to-live (TTL) field for carrying a TTL value, said system comprising:

a packet processor, located within a first one of said plurality of network nodes, for generating a right side packet and a left side packet from an ingress packet; and a loop protection module, located within said first network node, for learning the number (N) of network nodes on said ring and for setting a right side TTL value for said right side packet and a left side TTL value for said left side packet to values that are a function of N.

64. The system of claim 63 wherein said loop protection module includes means for setting said right side TTL value and said left side TTL value to values that prevent said right side packet and said left side packet from traveling on the same transmission link on said ring.

65. The system of claim 64 wherein said loop protection module includes means for setting said right side TTL value and said left side TTL value such that the maximum number of right side hops (MaxRightHops) plus the maximum number of left side hops (MaxLeftHops) is less than or equal to N−1, said function of N being expressed as:

MaxRightHops+MaxLeftHops≦N−1.

66. The system of claim 63 wherein said loop protection module includes means for setting said right side TTL value and said left side TTL value such that the furthest transmission link from said first network node is the transmission link that is not utilized by either said right side packet or left side packet.

67. The system of claim 63 wherein said step loop protection module includes means for setting said right side TTL value and said left side TTL value in response to link performance information related to said transmission links that connect said network nodes into said ring.

68. The system of claim 63 wherein said loop protection module includes means for dynamically adjusting said right and left side TTL values.

69. The system of claim 63 wherein said right side ringport of a first network node transmits said right side packet and wherein said left side ringport of said first network node transmits said left side packet.

70. The system of claim 69 further including means for decrementing said right side TTL value of said right side packet at each network node on said ring that receives said right side packet and said left side TTL value of said left side packet at each network node on said ring that receives said left side packet.

71. The system of claim 63 wherein said label is located between two Data Link layer headers.

72. The system of claim 63 wherein said network nodes utilize Ethernet at the Data Link layer.

73. The system of claim 63 wherein said label is a Multiprotocol Label Switching (MPLS) header.

74. The method of claim 1 wherein said right side and left side TTL values are set in TTL fields of labels that are utilized for label switching.

75. The method of claim 16 wherein said right side and left side TTL values are set in TTL fields of labels that are utilized for label switching.

76. The system of claim 28 wherein said right side and left side TTL values are set in TTL fields of labels that are utilized for label switching.

77. The system of claim 40 wherein said right side and left side TTL values are set in TTL fields of labels that are utilized for label switching.

78. The system of claim 51 wherein said right side and left side TTL values are set in TTL fields of labels that are utilized for label switching.

79. The system of claim 63 wherein said right side and left side TTL values are set in TTL fields of labels that are utilized for label switching.

* * * * *